(12) United States Patent
Rosen

(10) Patent No.: US 7,240,637 B2
(45) Date of Patent: Jul. 10, 2007

(54) FENCE-COVERING SYSTEM

(76) Inventor: John B. Rosen, P.O. Box 2639, La Pine, OR (US) 97739

( * ) Notice: Subject to any disclaimer, the term of this patent is extended or adjusted under 35 U.S.C. 154(b) by 156 days.

(21) Appl. No.: 10/841,109

(22) Filed: May 7, 2004

(65) Prior Publication Data

US 2005/0263093 A1   Dec. 1, 2005

(51) Int. Cl.
  *A01K 1/00*   (2006.01)
  *E04H 17/16*  (2006.01)
(52) U.S. Cl. .................. 119/524; 119/523; 256/24
(58) Field of Classification Search ............ 119/452, 119/502, 512, 513, 516, 519, 522, 523, 524; 256/24, 32, 73
See application file for complete search history.

(56) References Cited

U.S. PATENT DOCUMENTS

| | | | |
|---|---|---|---|
| 2,771,088 A | 11/1956 | Soldan | |
| 3,305,221 A | 2/1967 | Kling | |
| 3,537,688 A | 11/1970 | Stein | |
| 3,741,529 A | 6/1973 | Blagg | |
| 3,933,311 A | 1/1976 | Lemelson | |
| 3,973,756 A * | 8/1976 | Lauzier | 256/21 |
| 4,014,520 A * | 3/1977 | Walters | 256/22 |
| 4,198,034 A * | 4/1980 | Svirklys | 256/72 |
| 4,576,364 A | 3/1986 | O'Fearna | |
| 4,730,810 A | 3/1988 | Rambaud | |
| 4,738,563 A | 4/1988 | Clark | |
| 4,896,864 A * | 1/1990 | Nusbaum | 256/23 |
| 4,968,005 A * | 11/1990 | Zen | 256/22 |
| 5,010,603 A | 4/1991 | Hertzog | |
| 5,063,876 A | 11/1991 | Harris | |
| 5,177,890 A * | 1/1993 | Hisatomi et al. | 40/447 |
| 5,335,684 A | 8/1994 | Hanninen | |
| 5,390,913 A | 2/1995 | Kepler | |
| 5,396,739 A * | 3/1995 | Venegas, Jr. | 52/33 |
| 5,402,988 A | 4/1995 | Eisele | |
| 5,406,762 A * | 4/1995 | Buard | 52/287.1 |
| 5,429,449 A * | 7/1995 | Baatz | 404/6 |
| 5,458,942 A | 10/1995 | Miller | |

(Continued)

FOREIGN PATENT DOCUMENTS

CA   2130051   *  2/1996

(Continued)

OTHER PUBLICATIONS

Brochure entitled *Powder Mountain Horse Equipment*, publication date unknown.

*Primary Examiner*—David Parsley
(74) *Attorney, Agent, or Firm*—Klarquist Sparkman, LLP (57) ABSTRACT

A fence-covering system for covering the openings in fence structures, such as an animal corral or arena. According to one aspect, a fence-covering system includes one or more removable fence-covering members that snap-fit onto the existing rails of a fence. Each fence-covering member can include an upper rail-engaging end portion that engages a horizontal rail of the fence, a lower rail-engaging end portion that engages another horizontal rail of the fence, and a generally flat panel member that covers the openings between the rails. According to another aspect, a fence-covering system comprises a sheet of a strong, flexible material, such as a fabric or fabric-like material, that is wrapped around the rails of a fence.

9 Claims, 5 Drawing Sheets

U.S. PATENT DOCUMENTS

| | | |
|---|---|---|
| 5,480,126 A | 1/1996 | Teasdale |
| 5,664,769 A | 9/1997 | Sadinsky et al. |
| 5,702,090 A | 12/1997 | Edgman |
| 5,772,186 A | 6/1998 | Parker |
| 5,899,044 A | 5/1999 | Jarrett |
| 6,053,845 A | 4/2000 | Publicover et al. |
| 6,113,076 A * | 9/2000 | Hancock-Bogese et al. ... 256/1 |
| 6,202,987 B1 * | 3/2001 | Forbis ......................... 256/24 |
| 6,311,955 B1 | 11/2001 | McGarry et al. |
| 6,328,284 B2 | 12/2001 | Wilding |
| 6,460,829 B1 | 10/2002 | Forbis et al. |
| 6,675,517 B1 | 1/2004 | Chia et al. |
| 6,719,276 B1 * | 4/2004 | Bush ............................. 256/1 |
| 6,945,517 B2 * | 9/2005 | Augur ........................... 256/1 |
| 2001/0048103 A1 * | 12/2001 | Painter ....................... 256/65 |
| 2003/0075114 A1 | 4/2003 | Goldwitz et al. |

FOREIGN PATENT DOCUMENTS

| | | | |
|---|---|---|---|
| GB | 2070664 | * | 9/1981 |

* cited by examiner

FIG. 6   FIG. 7   FIG. 8A   FIG. 9

FENCE-COVERING SYSTEM

FIELD

The present disclosure concerns embodiments of a fence-covering system for covering a fence or enclosure, such as an animal-containment pen.

BACKGROUND

Fenced enclosures for containing horses or other types of livestock are commonly referred to as corrals or pens (large corrals are referred to as arenas). Such enclosures typically are constructed from multiple, interconnected fence sections (commonly referred to as panels). Each fence section typically is constructed from multiple, horizontally-spaced, upright posts and multiple, horizontally extending, vertically spaced, tubular rails welded to the upright posts. Consequently, large openings or spaces in the fence sections are defined between the upright posts and the horizontal rails. A drawback of this type of enclosure is that an animal and/or a person riding an animal can be seriously injured if the animal accidentally inserts a leg through an opening in a fence section. Another drawback is that when training an animal inside the enclosure, the animal can become distracted by activities outside of the enclosure, which slows or inhibits the training process.

SUMMARY

The present disclosure concerns embodiments of a fence-covering system that can be used on fences or enclosures, such an animal corrals. As used herein, the term "fence" is used generally to refer to enclosures or containment systems such as enclosed fence structures (e.g., corrals) and to fence structures that do not form complete enclosures.

An embodiment of the disclosed fence-covering system includes one or more, removable fence panels that snap-fit onto rails of a fence. This snap-fit arrangement secures the panels to the fence without using separate fasteners or adhesives, but allows the panels to be quickly and easily removed from the fence when desired. The fence panels function to cover spacing between the rails of the fence. Such covering may be used to, e.g., prevent or at least minimize outside activities from becoming a visual distraction to an animal inside the fence. When installed on the inside of the fence, the fence panels may also serve as a barrier to help prevent an animal from inserting a part of its body, such as a leg, through an opening in the fence.

In a specific embodiment, a fence-covering system comprises at least a first removable fence panel that includes deformable, upper and lower end portions that form a snap-fit connection with a first rail and a second, lower rail of the fence, respectively. The system can include a second removable fence panel for mounting on the opposite side of the fence from the first fence panel. The second fence panel can include deformable, upper and lower end portions that form a snap-fit connection with the upper and lower end portions of the first fence panel. Alternatively, the second fence panel can be adapted for mounting above or below the first fence panel on the opposite side of the fence from the first fence panel. For example, the second fence panel can have deformable, upper and lower end portions that form a snap-fit connection with the second rail and third rail located below the second rail.

In another embodiment, a fence-covering system comprises at least one fence-covering member that includes a first panel member and a second panel member connected to the first panel member. When placed on a fence, the first panel member covers spacing between rails on one side of the fence and the second panel member covers spacing between rails on the other side of the fence opposite the first panel member. The first panel member can have an end portion that is adapted to form a releasable connection with an opposing end portion of the second panel to secure the fence-covering member on the fence. For example, the end portion of the first panel member can be adapted to form a snap-fit connection with the end portion of the second panel member.

In some embodiments, the panel members can be sized to extend vertically between the uppermost rail of the fence and the ground. Some types of fences, such as a typical conventional corral, include a lower rail that is spaced above of the ground. When installing the fence-covering member on such a fence, a removable rail can be secured to the fence below the lower rail to stabilize the panel members below the lower rail. The lower end portions of the panel members can be configured to extend around the removable rail and form a releasable connection with each other to secure the fence-covering member to the fence. Alternatively, the lower end portions of the panel members can be secured to the removable rail using fasteners or in any other suitable manner.

According to another embodiment, a fence-covering system includes at least one sheet of a strong, flexible material that is removably secured to the rails of a fence. The sheet can be made of, for example, rubber, vinyl, neoprene, a fabric or a fabric-like material (e.g., canvas or nylon), or various other materials. The sheet can be sized and shaped to be wrapped around first and second rails of a fence, such as the uppermost and lowermost rail of the fence, so as to cover the openings between the rails on both sides of the fence. The adjacent end portions of the sheet can be connected to each other to secure the sheet to the fence.

The foregoing and other features and advantages of the invention will become more apparent from the following detailed description of several embodiments, which proceeds with reference to the accompanying figures.

DETAILED DESCRIPTION

As used herein, the singular forms "a," "an," and "the" refer to one or more than one, unless the context clearly dictates otherwise. As used herein, the term "includes" means "comprises."

The present disclosure concerns embodiments of a fence-covering system for use on a fence or enclosure. By way of example, the embodiments of fence-covering systems disclosed herein are described in connection with the fence 10 depicted in FIG. 1, which has a construction that is similar to a typical conventional corral or arena. However, the embodiments disclosed herein can be adapted for use on various other fence structures, such as a wood fence.

Figures 1, 3:
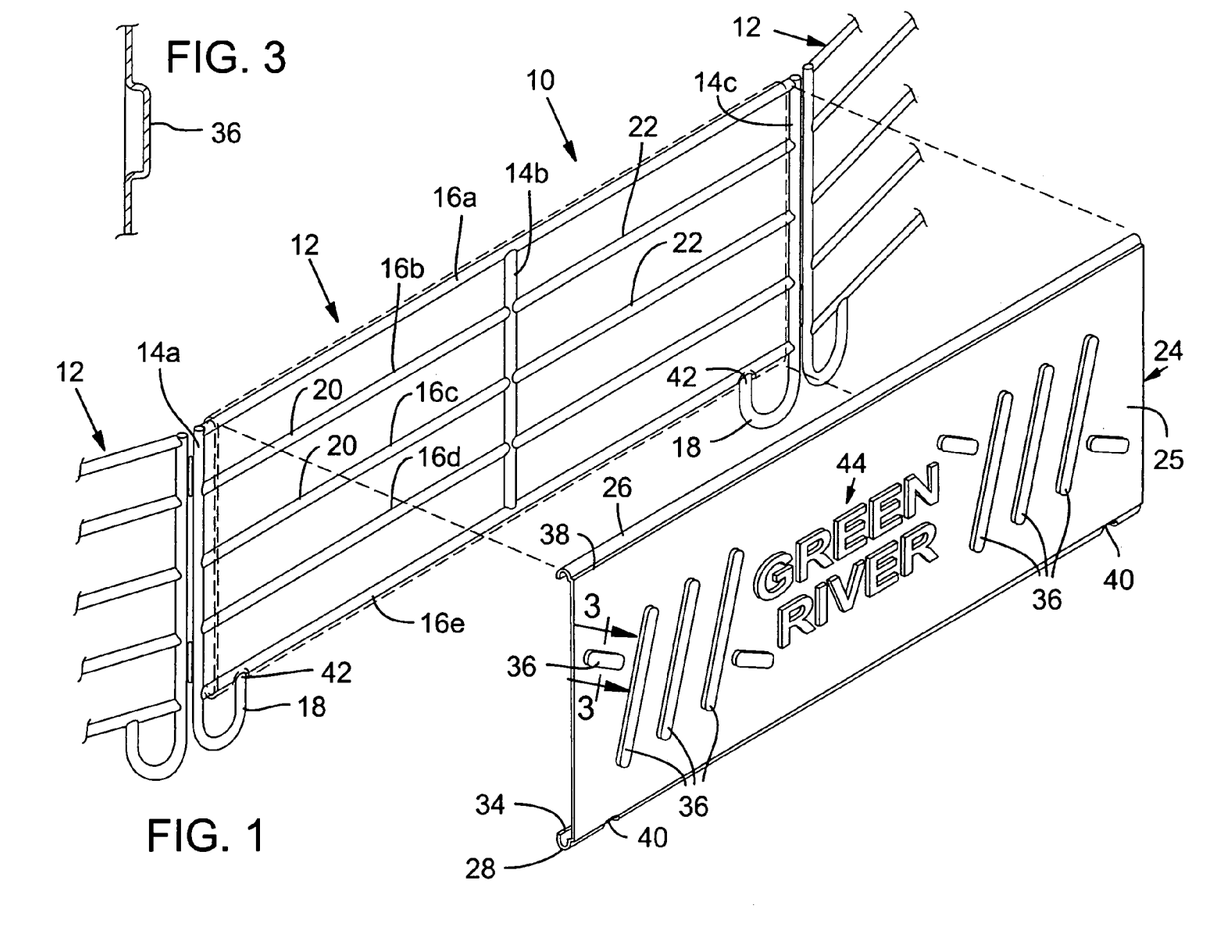
FIG. 1 is a perspective view showing a portion of a fence and a removable fence-covering member for mounting on a section of the fence, according to one embodiment.
FIG. 3 is a cross-sectional view of a portion of the fence-covering member of FIG. 1 taken along line 3-3 of FIG. 1.

As shown in FIG. 1, the fence 10 is constructed from a plurality of interconnected fence sections 12. Although not shown in the figures, the fence sections 12 can be arranged to form an enclosure for containing animals, such as horses. The fence sections 12 in the illustrated embodiment include a plurality of elongated upright support members or posts, such as vertical posts 14a, 14b, and 14c, and a plurality of elongated, horizontally extending support members or rails, such as rails 16a, 16b, 16c, 16d, and 16e that are secured to the vertical posts, such as by welding or other suitable techniques or mechanisms. The vertical posts 14a-14c and the horizontal rails 16a-16e of the illustrated fence 10 comprise elongated, tubular or pipe-like elements. The outer vertical posts 14a and 14c can include upturned, curved lower portions 18 that support the respective fence section 12 on the ground. Each of the horizontal rails 16b-16d may include a first rail section 20 extending between the outer post 14a and the center post 14b and a second rail section 22 extending between the center post 14b and the outer post 14c.

Referring to FIGS. 1-4, one embodiment of a fence-covering system that can be installed on the fence 10 includes one or more removable fence-covering members 24 (one of which is shown in FIG. 1) that mount on respective fence sections 12. The illustrated fence-covering member 24 may comprise a body that includes a generally flat panel 25, a curved, upper end portion 26 that engages the uppermost rail 16a, and a curved, lower end portion 28 that engages a lower rail or the lowermost rail 16e. The fence-covering member 24 can be mounted on the outside of an enclosure, such as depicted in FIG. 1, or on the inside of an enclosure.

The fence-covering member 24 may be translucent or opaque to obscure or block an animal's view through the fence. Advantageously, this prevents any visual distractions on the other side of the fence from distracting an animal and disrupting the training process of the animal. To achieve this goal, the fence-covering member can be constructed from a non-transparent material. Alternatively, the fence-covering member can be constructed from a transparent material and a non-transparent layer, such as layer of paint or other surface coating or layer, can be placed on one or both sides of the fence-covering member. In other embodiments the fence-covering member can be transparent.

When installed on the inside of the fence, the fence-covering member 24 also serves as a barrier to help prevent an animal from inserting a body part, such as a leg, through an opening in the fence section 12.

Figure 6:
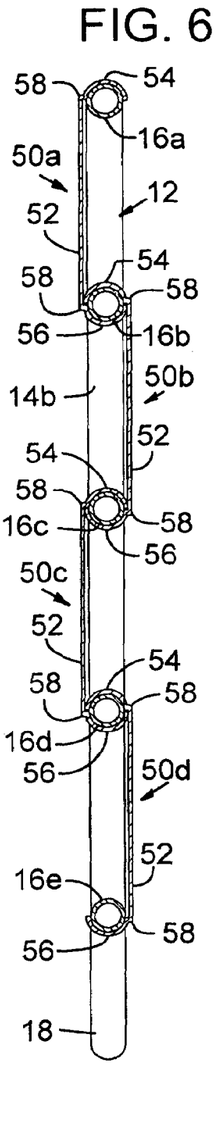
FIG. 6 is a vertical cross-sectional view showing multiple removable fence-covering members mounted on a fence section, according to another embodiment.

The fence-covering member 24 in the illustrated form has a length that extends horizontally between the outer posts 14a and 14c and a height that extends vertically between the uppermost rail 16a and the lowermost rail 16e. However, in other embodiments, the size of the fence-covering member can vary. For example, the length of the fence-covering member can be less than the length of the fence section 12, and/or multiple fence-covering members can be installed side-by-side along the length of the fence section. As another example, the height of the fence-covering member can be less than the distance between rails 16a and 16e, and/or multiple fence-covering members can be installed in multiple horizontal courses of one or more fence-covering members (e.g., as shown in FIG. 6).

Figure 4:
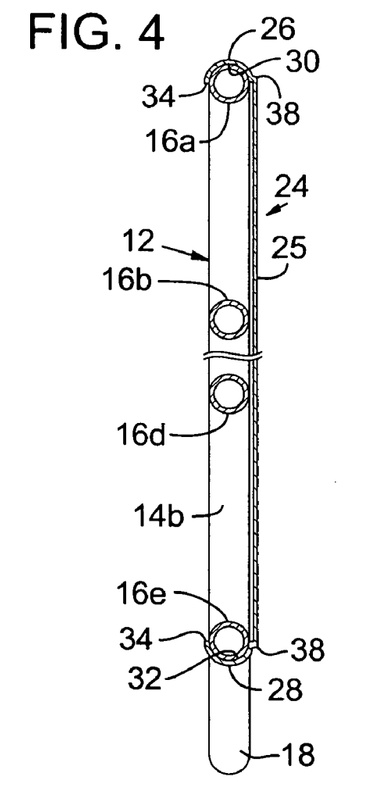
FIG. 4 is a vertical cross-sectional view of the fence-covering member of FIG. 1.

As best shown in FIG. 4, in one embodiment the upper and lower end portions 26, 28 have respective inner rail-engaging surfaces 30 and 32 that desirably are curved to generally conform to the shape of the rails. In certain embodiments, the upper end portion 26 comprises a deformable rail-engagement member and the lower end portion 28 comprises a deformable rail-engagement member, which are configured to engage the uppermost horizontal rail 16a and the lowermost horizontal rail 16e in a "snap-fit" arrangement to secure the fence-covering member 24 to the fence section 12.

As used herein, a "snap-fit" arrangement or a "snap-fit" connection means a releasable connection between two bodies having opposing surfaces, which connection is formed by resiliently deforming at least one of the bodies so as to allow the opposing surfaces to be placed in an interlocking relationship with each other. In the illustrated embodiment, for example, the opposing surfaces that are placed in an interlocking relationship are the inner rail-engaging surfaces 30, 32 and the outer surfaces of rails 16a, 16e. This "snap-fit" connection allows the fence-covering member to be mounted to a fence section without using any removable fasteners, such as bolts or screws, or adhesives. Additionally, the snap-fit connection may prevent inadvertent removal of the fence-covering member, but allows it to be easily removed from the fence section when so desired. In alternative embodiments, the upper and lower end portions do not have curved rail-engaging surfaces but are otherwise shaped to extend around portions of respective rails so as to be capable of forming a snap-fit connection with two rails. For example, the upper and lower end portions can have a generally U-shaped cross section with flat inner surfaces.

Generally, the resiliency of the upper and lower end portions 26, 28 allows the fence-covering member 24 to be mounted to and removed from a fence section. For example, engagement of the fence-covering member 24 with a fence section can be achieved by first positioning the upper end portion 26 around the uppermost rail 16a and positioning the lower edge 34 of the lower end portion 28 against the lowermost rail 16e. The lower edge 34 is then forced or urged against the rail 16e, which causes the lower end portion 28 to slightly deform from its normal shape and allow the lower edge 34 to slide over the lower surface of the rail 16e. Once the lower edge 34 clears the lowermost point on the rail 16e, the lower end portion 28 engages the rail 16e in the manner depicted in FIG. 4. Alternatively, the fence-covering member can be mounted to the fence section in a similar manner by first positioning the lower end portion 28 around the rail 16e and then pressing the upper end portion 26 onto the rail 16a, or simultaneously pressing both end portions 26, 28 onto the rails 16a, 16e, respectively. The fence-covering member 24 can be easily removed from the fence section, for example, by slightly bending or deforming one or both end portions away from its engagement with a respective rail while moving the fence-covering member away from the fence section.

The rail engaging surfaces 30, 32 can have a radius of curvature that is the same as or slightly smaller than the radius of curvature of the rails such that, when the fence-covering member is mounted on a fence section, the end portions 26, 28 are slightly deformed from their normal shape and tightly engage the outer surfaces of the rails 16a, 16e. Alternatively, the rail engaging surfaces 30, 32 can have a radius of curvature that is slightly larger than the radius of curvature of the rails such that, when the fence-covering member is mounted on a fence section, the end portions 26, 28 retain their normal shape and the inner surfaces 30, 32 of end portions 26, 28 engage the outer surfaces of the rails 16a, 16e (as shown in FIG. 4). To ensure a firm grip with the rails 16a, 16e, the end portions may extend about 180° around the rails, although in other embodiments the end portions can extend more or less than 180° around the rails.

Although the fence-covering member is shown as being installed on a fence having cylindrical rails, this is not a requirement. Accordingly, the illustrated fence-covering member can be snap-fitted onto differently shaped rails (e.g., rails having a square, rectangular, or oval cross-sectional profile). In some embodiments, the upper and lower end portions can be shaped to conform to the shape of such rails, although this is not a requirement. For example, the upper and lower end portions can have flat inner surfaces that generally conform to rails that have a rectangular or square cross-sectional profile.

In an alternative embodiment, the end portions can be sized and shaped to loosely engage the rails 16a, 16e but otherwise form a snap fit connection with the rails to retain the fence-covering member on a fence section. Thus, in this alternative embodiment, the upper end portion would support the fence-covering member on the rail 16a and there would be a small gap or space between the inner surface 32 of the lower end portion 28 and the adjacent surface of the rail 16e. In other embodiments, the fence-covering member can be secured to a fence section using screws, bolts, clamps, or other types of fasteners.

As shown in FIG. 1, the fence-covering member 24 can be formed with one or more elongated, integral reinforcing ribs 36 to increase its rigidity. As best shown in FIG. 3, the ribs 36 in the illustrated embodiment have a generally rectangular cross-sectional profile, although the ribs can comprise other geometric shapes. In other embodiments, reinforcing ribs can be separately formed and subsequently secured to the fence-covering member.

As best shown in FIG. 4, the panel 25 is connected to the upper and lower end portions 26, 28 at one or more stepped portions 38 so that the inner surface of panel 25 is slightly recessed or offset from the inner surfaces 30, 32 of the end portions. This configuration allows the end portions to be more readily bendable relative to the panel when installing or removing the fence-covering member. However, in an alternative embodiment the fence-covering member can be formed without stepped portions 38, and therefore conforms more closely to a "C" shape.

Figure 2:
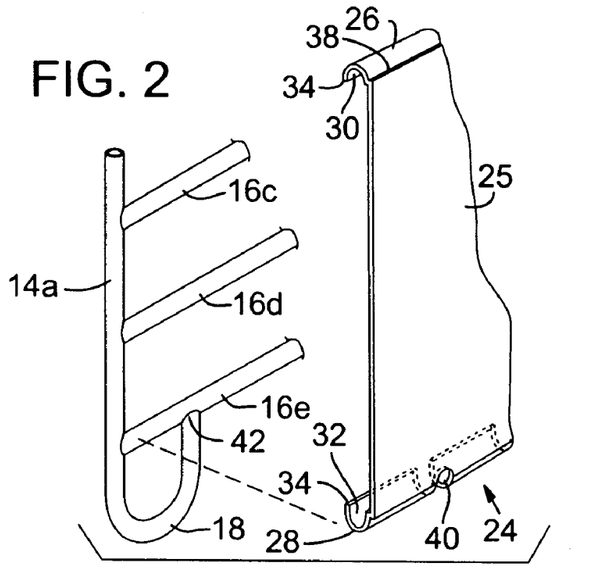
FIG. 2 is an enlarged, perspective view of a portion of the fence-covering member and fence section of FIG. 1.

As shown in FIGS. 1 and 2, the lower end portions 18 of the outer posts 14a, 14c curve inwardly and upwardly and intersect the lowermost rail 16e at their ends 42. To accommodate mounting the lower end portion 28 to the rail 16e, the lower end portion 28 can be formed with cut-outs 40 that are sized and shaped to receive the lower end portions 18 of posts 14a, 14c. In addition, the fence-covering member 24 can include optional signage, logos, or other indicia on one or both sides thereof, such as illustrated by way of example at 44 in FIG. 1.

In particular embodiments, the fence-covering member 24 is constructed from a single piece of material and has a unitary, monolithic construction. As used herein, the term "monolithic construction" refers to a construction that does not include any welds, fasteners, or other mechanisms for joining components to each other.

The fence-covering member 24 can be made from any of various materials, including without limitation, metal (e.g., steel or aluminum), plastic or combinations thereof. Any of various manufacturing techniques can be implemented to manufacture the fence-covering member 24 (and the other embodiments disclosed herein). In one approach, for example, the fence-covering member can be constructed using conventional plastic-extrusion techniques. The ribs 36 and indicia 44 can be stamped or embossed into the fence-covering member by, for example, feeding the fence-covering member through one or more pairs of roller stamps. In another embodiment, the fence-covering member can be constructed using plastic-molding techniques, such as injection molding.

In another approach, one or more portions of the fence-covering member can be separately formed and subsequently joined to each other, such as by welding or with mechanical fasteners. For example, the upper and lower end portions 26, 28 can be formed from separate pieces of material that are welded or attached to the panel 25 using fasteners. Depending upon the materials that are used, different components may be molded (e.g., of plastic) or otherwise formed into their desired shapes. In addition, different materials may be used for different components. For example, the panel 25 may be formed of metal while the upper and lower end portions 26, 28 may be formed of plastic. Also, the panel 25 can be made of a substantially rigid material while the upper and lower end portions 26, 28 can be made of a deformable, resilient material to facilitate a snap-fit connection with rails of a fence.

Figure 5:
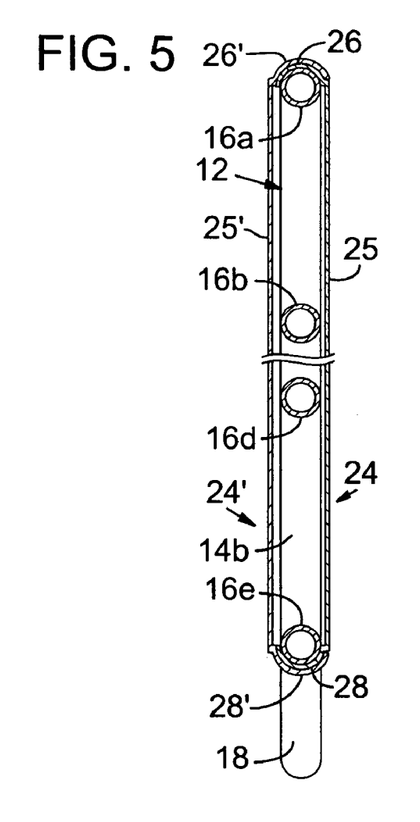
FIG. 5 is a vertical cross-sectional view of the fence-covering member of FIG. 4 and another removable fence-covering member installed on the opposite side of the fence section.

Referring now to FIG. 5, an additional fence-covering member 24' can be installed on the fence section 12 opposite the fence-covering member 24 to cover both sides of the fence section. The fence-covering member 24' can have a construction that is similar or identical to the fence-covering member 24. The upper and lower end portions 26', 28' of the fence-covering member 24' may be adapted to engage the upper and lower end portions 26, 28 of the fence-covering member 24 in a snap-fit arrangement to retain the fence-covering member 24 on the fence, as depicted in FIG. 5.

FIG. 6 shows a fence-covering system, according to another embodiment, comprising one or more fence-covering members, e.g., 50a-50d. A fence-covering member 50a-50d may comprise a respective panel 52, and upper and lower end portions 54 and 56, respectively, that form a snap-fit connection with two vertically adjacent rails. The fence-covering member can be formed with stepped portions 58 connecting a respective panel 52 to respective upper and lower end portions 54, 56. As shown, for example, fence-covering member 50a forms a snap-fit connection with rails 16a and 16b, fence-covering member 50b forms a snap-fit connection with rails 16b and 16c, fence-covering member 50c forms a snap-fit connection with rails 16c and 16d, and fence-covering member 50d forms a snap-fit connection with rails 16d and 16e. Also, the fence-covering members 50a-50d may be installed on the fence section in an alternating fashion, so that fence-covering members 50a and 50c are installed on one side of the fence section and fence-covering members 50b and 50d are installed on the opposite side of the fence section, as shown in FIG. 6. As shown, stepped portions 58 allow the terminal ends of the upper and lower end portions 54, 56 of each fence-covering member to nest within the space between an associated rail and the inner surface of a vertically adjacent panel 52.

Figure 7:
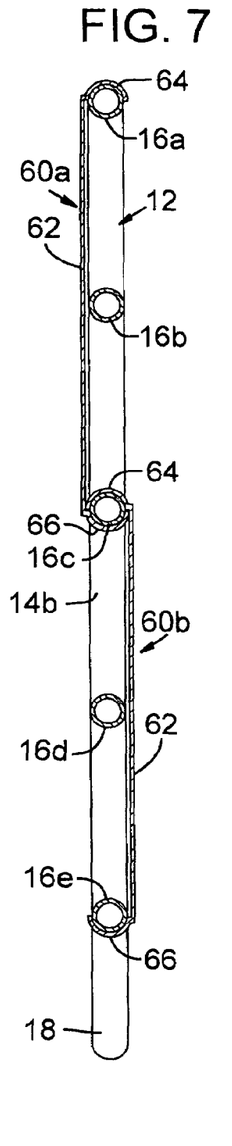
FIG. 7 is a vertical cross-sectional view showing multiple removable fence-covering members mounted on a fence section, according to yet another embodiment.

FIG. 7 shows another embodiment of a fence-covering system. This embodiment includes an upper fence-covering member 60a and a lower fence-covering member 60b. Each fence-covering member 60a, 60b can comprise a body that includes a panel 62, and upper and lower rail-connecting end portions 64 and 66, respectively. The upper fence-covering member 60a extends vertically between and may form a snap-fit connection with rails 16a and 16c, and the lower fence-covering member 60b extends vertically between and may form a snap-fit connection with rails 16c and 16e.

Figure 8A:
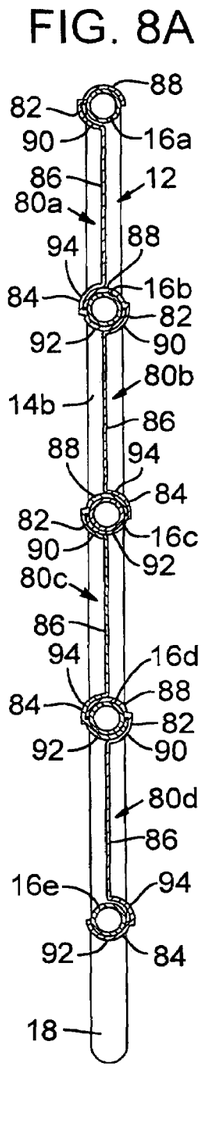
FIG. 8A is a vertical cross-sectional view showing multiple removable fence-covering members mounted on a fence section, according to still another embodiment.
Figure 8B:
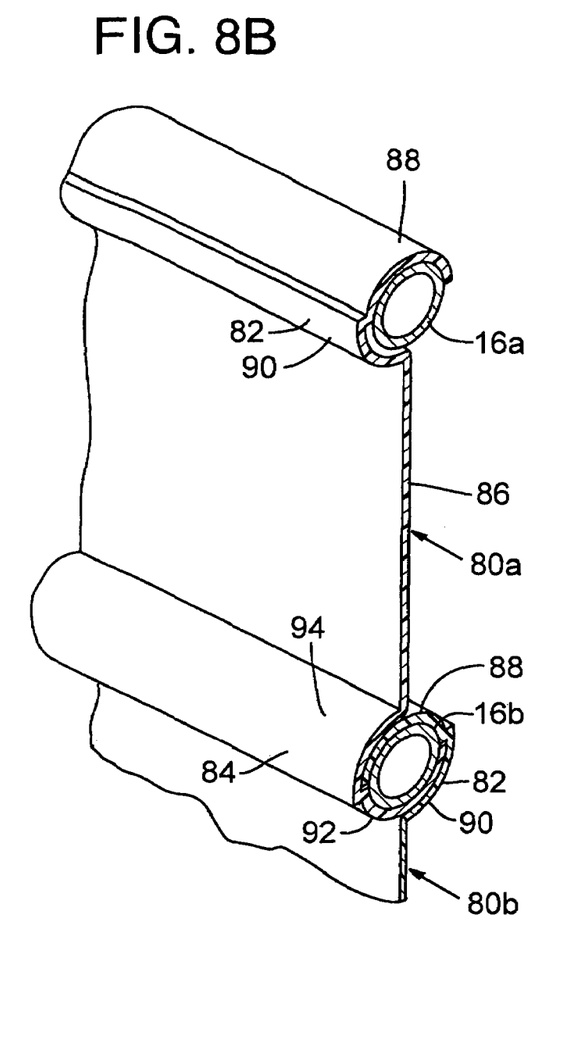
FIG. 8B is an enlarged, partial perspective view of the upper two fence-covering members shown in FIG. 8A.
Figure 8C:
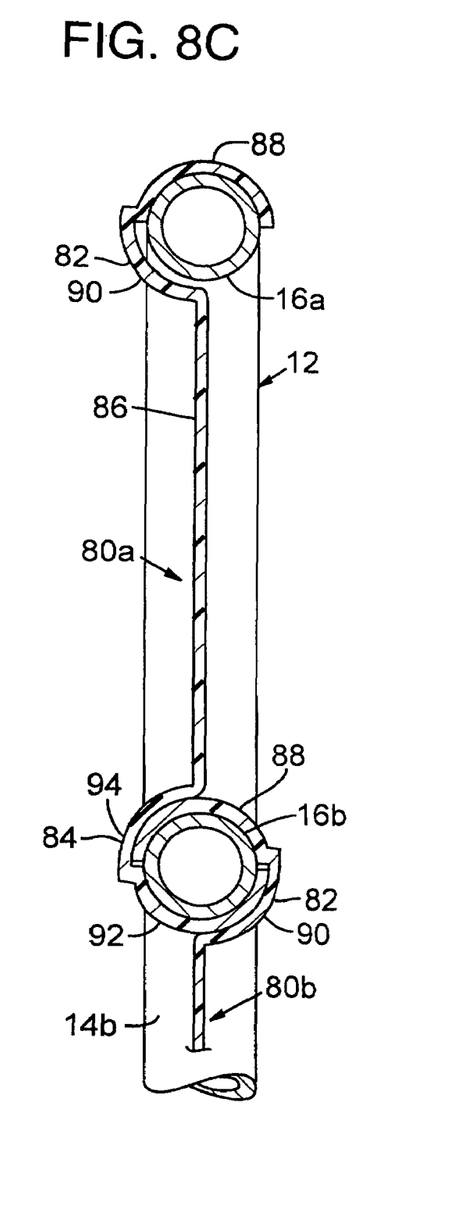
FIG. 8C is an enlarged, vertical cross-sectional view of the upper two fence-covering members shown in FIG. 8A.

FIG. 8 shows another embodiment of a fence-covering system that includes a plurality of fence-covering members 80a-80d. Like the embodiment shown in FIG. 6, fence-covering member 80a-80d may extend vertically between and form a snap-fit connection with two vertically adjacent rails. However, the construction of the fence-covering members 80a-80d of FIG. 8 is different from the construction of the fence-covering members 50a-50d of FIG. 6.

For example, each fence-covering member 80a-80d comprises an upper end portion 82 and a lower end portion 84 that are shaped to support a panel 86 at a vertical mid-plane of the fence section. The upper end portion 82 of each fence-covering member includes a first, rail-engaging portion 88 that extends around and engages an upper surface of a respective rail and a second portion 90, which has a greater radius of curvature than the first portion 88 and is spaced radially outwardly from the surface of the rail. Similarly, the lower end portion 84 of the fence-covering member may include a first, rail-engaging portion 92 that extends around and engages a lower surface of a respective rail and a second portion 94, which has a greater radius of curvature than the first portion 94 and is spaced radially outwardly from the surface of the rail. As shown in FIG. 8, the rail-engaging portion 88 of the fence-covering member is received in the space between an associated rail and curved portion 94 of a superjacent fence-covering member. Similarly, the rail-engaging portion 92 of the fence-covering member is received in the space between an associated rail and curved portion 90 of a subjacent fence-covering member.

Figure 9:
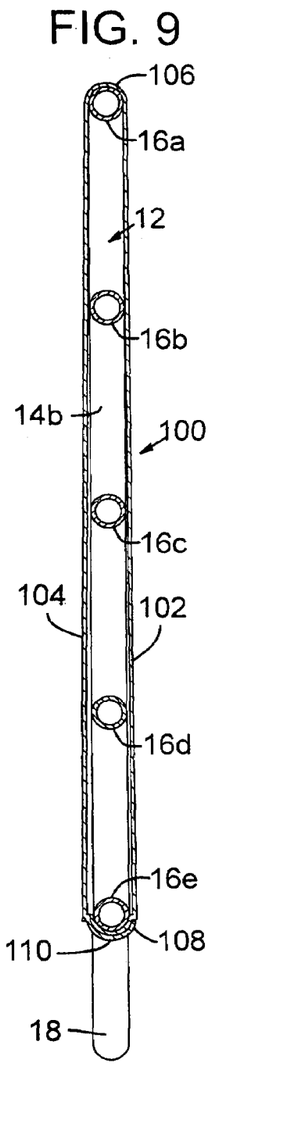
FIG. 9 is a vertical cross-sectional view showing another embodiment of a fence-covering member panel mounted on a fence section.

FIG. 9 shows a fence-covering member 100, according to another embodiment, that is adapted to be installed on a fence section 12. The illustrated fence-covering member 100 comprises a body that includes a first panel member 102 located on one side of the fence section and a second panel member 104 located on the opposite side of the fence section. When installed on the fence section 12, the fence-covering member 100 may envelope one or more of rails 16a-16e. The first and second panel members 102, 104 can be integrally connected to each other by an upper panel-connecting portion 106 that supports the fence-covering member 100 on the uppermost rail 16a. In the context of the present specification, panel members (or other components) that are "integrally connected" to each other are formed from a single piece of material and are not connected to each other by welds, adhesives or fasteners. The panel-connecting portion 106 can be curved as shown to conform to the shape of the rail 16a.

The first panel member 102 can include a first deformable lower end portion 108 that desirably firmly engages a lower rail, e.g., the lowermost rail 16e. The second panel member 104 includes an opposing, second deformable lower end portion 110 that desirably firmly engages and forms a snap-fit connection with the first lower end portion 108 to securely retain the fence-covering member on the fence section. The fence-covering member 100 can made of a resilient material so that the lower end portions 108, 110 can be separated from their interlocking position shown in FIG. 9 by bending the panel members 102, 104 away from each other. If desired, a fold line can be formed along the length of each panel member 102, 104 between the panel-connecting portion 106 and the upper portion of each panel member 102, 104 so that fence-covering member can be folded into the generally U-shaped configuration shown in FIG. 9.

In an alternative embodiment, the first and second panel members can be hingedly connected to a panel-connecting portion, in which case the panel members can be made of a substantially rigid material. Thus, in this alternative embodiment, the panel members may be swingable or pivotal relative to each other to permit installation and removal of the fence-covering member.

In addition, any other suitable type of mechanism can be used to interlock the lower end portions 108, 110 of the panel members. For example, one of the lower end portions can include a male hook connector and the other lower end portion can include a complimentary female catch that is adapted to receive the hook connector and prevent separation of the lower end portions under normal conditions of use. Alternatively, removable screws or other fasteners can be used secure the lower end portions to each other.

While the illustrated fence-covering member envelopes all of the rails of the fence section, this is not a requirement. Accordingly, in other embodiments, a fence-covering member can be sized to extend around any number of rails. For example, the fence-covering member can be sized to extend around 16a, 16b, 16c and 16d.

Figure 10:
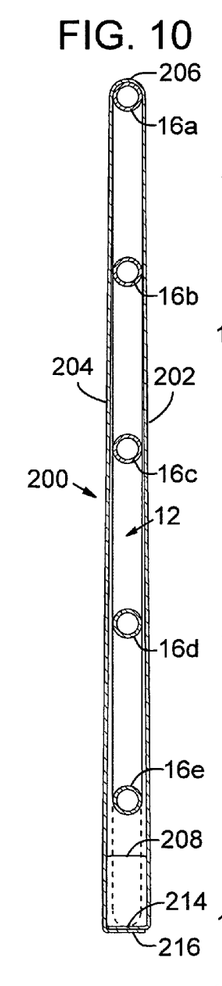
FIG. 10 is a vertical cross-sectional view showing yet another embodiment of a fence-covering member mounted on a fence section.

FIG. 10 shows a fence-covering member 200, according to another embodiment, that is similar to the fence-covering member 100 of FIG. 9. The fence-covering member 200 includes first and second panel members 202 and 204, respectively, that are integrally connected to each other by a panel-connecting portion 206 that extends around the uppermost rail 16a. Unlike the embodiment shown in FIG. 9, the panel members 202, 204 extend to the ground to cover the opening between the lowermost rail 16e and the ground.

Figures 11, 12, 14:
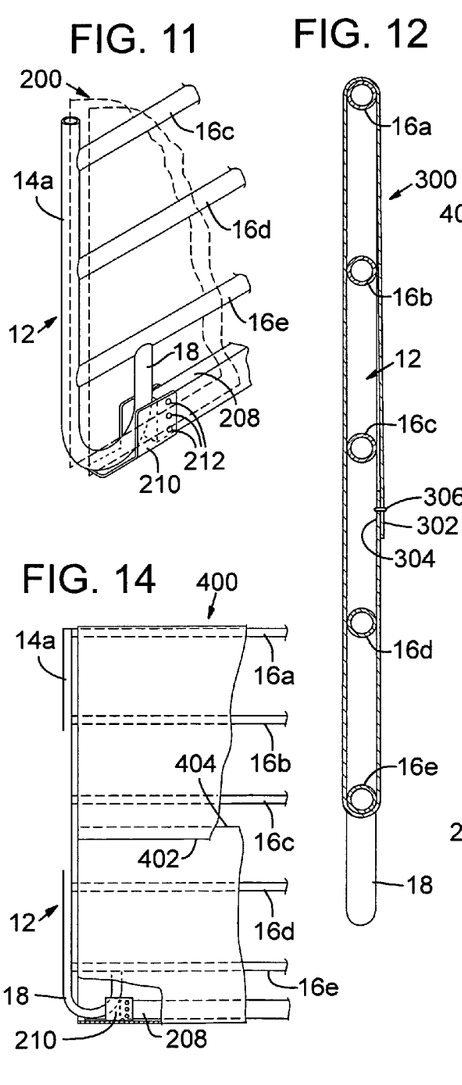
FIG. 11 is a partial perspective view of the fence-covering member and fence section of FIG. 10.
FIG. 12 is a vertical cross-sectional view of a fence covering shown installed on a fence section, according to another embodiment.
FIG. 14 is a front elevation view of a portion of the fence covering and fence section shown in FIG. 13.

As shown in FIGS. 10 and 11, to stabilize the bottom portion of the panel members 202, 204, an elongated, removable rail 208 can be positioned between the panel members 202, 204 at the bottom of the fence-covering member. The removable rail 208 can be, for example, a wooden 2×4, a length of pipe or channel, or various other types of materials. The removable rail 208 desirably extends along at least a major portion of the length of the fence-covering member and more desirably extends between the lower end portions 18 of the outer posts 14a, 14c. As shown in FIG. 11, each end of the removable rail 208 may be connected to the lower end portion 18 of an adjacent post 14a, 14c, such as with a generally U-shaped bracket 210. Each bracket 210 is sized to receive an end portion of the removable rail 208 and a portion of an adjacent lower post portion 18 in the manner shown in FIG. 11. Fasteners 212, which can be screws or various other types of fasteners, can be used to secure the brackets 210 to the ends of the removable rail 208.

As shown in FIG. 10, the panel members 202, 204 can include overlapping lower end portions 214 and 216, respectively, that extend below the removable rail 208. If desired, the lower end portions 214, 216 can be configured to form a tight engagement with each other to assist in preventing separation of the lower end portions under normal conditions of use. Additionally, optional screws or other fasteners (not shown) can be used to secure the panel members 202, 204 directly to the removable rail 208.

Referring now to FIG. 12, there is shown a fence-covering member 300, according to yet another embodiment, for installation on a fence section 12. The illustrated fence-covering member 300 desirably comprises a sheet of a strong, tear-resistant flexible material, such as a fabric or fabric-like material. For example, the fence-covering member can comprise a sheet of canvas, nylon, or other synthetic or non-synthetic fabrics.

As shown, the fence-covering member 300 can comprise a single piece of material that is sized to envelope or enclose a selected number of horizontal rails. In the illustrated embodiment, for example, the fence-covering member envelopes all of the rails, although this is not a requirement. In addition, the fence-covering member can be cut or otherwise formed to have any desired length. In particular embodiments, for example, the fence-covering member 300 has a length that is substantially equal to the length of the fence section.

To retain the fence-covering member 300 on the fence section 12, the fence-covering member desirably is wrapped tightly around the upper and lower rails 16a, 16e and the adjacent end portions 302 and 304 of the fence-covering member are coupled to each other using any of various techniques or mechanisms. For example, the end portions 302, 304 can be secured to each other using hook and loop fasteners (e.g., VELCRO® fasteners), buckles, snap-hooks, a zipper, or other fasteners that allow the end portions to be connected to each other in a releasable manner. Alternatively, a plurality of apertures can be formed along the length of each end portion 302, 304, and a flexible cord or rope 306 can be alternatively weaved through the apertures in end portion 302 and the apertures in end portion 304.

Figure 13:
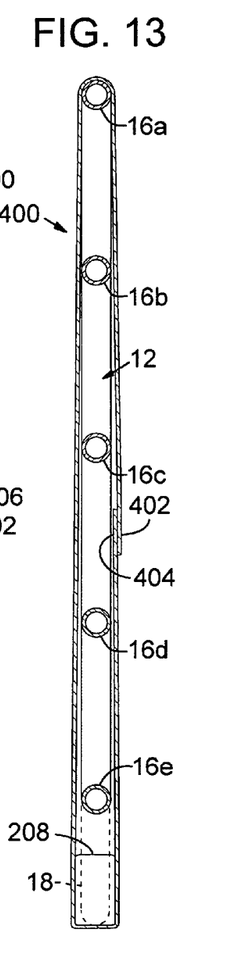
FIG. 13 is a vertical cross-sectional view of another embodiment of a fence covering shown installed on a fence section.

FIGS. 13 and 14 show another embodiment of a flexible fence-covering member, indicated at 400, that is similar to the embodiment shown in FIG. 12. The embodiment shown in FIGS. 13 and 14 extends around a removable rail 208 supported on the ground to provide a covering for the opening between the lowermost rail 16e and the ground. The removable rail 208 can be coupled to the lower end portions 18 of the outer posts 14a, 14c, such as with the illustrated brackets 210. The fence-covering member 400 includes end portions 402, 404 that are coupled to each other using a suitable releasable fastener(s).

The present invention has been shown in the described embodiments for illustrative purposes only. The present invention may be subject to many modifications and changes without departing from the spirit or essential characteristics thereof. I therefore claim as my invention all such modifications as come within the spirit and scope of the following claims.

I claim:

1. A fence-covering system and a fence having plurality of horizontally extending, vertically spaced, tubular rails, the fence-covering system comprising at least one removable fence-covering member having upper and lower end portions, each of which is deformable to engage and extends around a respective rail in snap-fit arrangement, thereby securing the fence-covering member to the fence, wherein:

the at least one removable fence-covering member comprises a first removable fence-covering member attached to one side of the fence; and the fence-covering system further comprises a second removable fence-covering member attached to the opposite side of the fence in a face-to-face relationship with respect to the first removable fence-covering member, the second removable fence-covering member having upper and lower end portions that are deformable to engage and extend around the upper and lower end portions, respectively, of the first removable fence-covering member in a snap-fit arrangement so as to secure the second removable fence-covering member to the first removable fence-covering member.

2. A fence-covering system and a fence having a plurality of horizontally extending, vertically spaced, tubular rails, the fence covering system comprising at least one removable fence-covering member having upper and lower end portions, each of which is deformable to engage and extends around a respective rail in a snap-fit arrangement, thereby securing the fence-covering member to the fence, wherein;

the at least one removable fence-covering member comprises a first removable fence-covering member attached to one side of the fence, wherein the upper end portion is deformable to engage and extends around a first rail of the fence in a snap-fit arrangement and the lower end portion is deformable to engage and extends around a second rail in a snap-fit arrangement, wherein the second rail is located below the first rail; and the fence-covering system further comprises a second removable fence-covering member attached to the opposite side of the fence below the first removable fence-covering member, the second removable fence-covering member having upper and lower end portions wherein the upper end portion of the second removable fence-covering member is deformable to engage and extends around the second rail in a snap-fit arrangement and the lower end portion of the second removable fence-covering member is deformable to engage and extends around a third rail in a snap-fit arrangement, wherein the third rail is located below the second rail.

3. The fence-covering system of claim 2, wherein the lower end portion of the first removable fence-covering member engages a lower surface portion of the second rail and the upper end portion of the second removable fence-covering member engages an upper surface portion of the second rail.

4. A removable fence covering and a fence having a plurality of horizontally extending, vertically spaced rails, the fence covering comprising:

a first panel member covering space between at least a first rail and a second rail on one side of the fence; and a second panel member coupled to the first panel member covering the space between the first and second rails on the other side of the fence opposite the first panel member;

wherein the first and second panel members are removably mounted directly to the first and second rails of the fence;

wherein the first panel member defines a first end portion and the second panel member defines a second end portion releasably engaging the first end portion to retain the fence covering on the fence;

wherein the first end portion has a curved inner surface and a curved outer surface, wherein the inner surface is snap-fitted to one of the first and second rails;

wherein the second end portion has a curved inner surface that is snap-fitted to the outer surface of the first end portion.

5. The fence covering of claim 4, wherein:

the second rail is the lowest rail of the fence and is spaced from the ground; and the first and second panel members extend below the second rail.

6. The fence covering of claim 4, wherein the first and second panel members are connected to each other at an upper end portion that is generally shaped to conform to the outer surface of the first rail.

7. The fence covering of claim 4, wherein the first and second panel members are plastic.

8. The fence covering of claim 4, wherein the first and second panel members extend from the uppermost rail of the fence to the lowermost rail of the fence.

9. The fence covering of claim 4, wherein the first and second panel members extend from the uppermost rail of the fence to the ground.

* * * * *

UNITED STATES PATENT AND TRADEMARK OFFICE
CERTIFICATE OF CORRECTION

| | | |
|---|---|---|
| PATENT NO. | : 7,240,637 B2 | Page 1 of 1 |
| APPLICATION NO. | : 10/841109 | |
| DATED | : July 10, 2007 | |
| INVENTOR(S) | : John B. Rosen | |

It is certified that error appears in the above-identified patent and that said Letters Patent is hereby corrected as shown below:

Column 11, line 2, "having plurality" should be changed to --having a plurality--.

Signed and Sealed this

Thirteenth Day of May, 2008

JON W. DUDAS
*Director of the United States Patent and Trademark Office*